United States Patent
Sasa

(10) Patent No.: US 7,399,797 B2
(45) Date of Patent: Jul. 15, 2008

(54) CATIONIC POLYMERIZABLE COMPOSITION, ACTINIC RAY CURABLE INK-JET INK AND STABILIZATION METHOD OF THE CATIONIC POLYMERIZABLE COMPOSITION

(75) Inventor: Nobumasa Sasa, Sayama (JP)

(73) Assignee: Konica Minolta Medical & Graphic, Inc., Tokyo (JP)

( * ) Notice: Subject to any disclaimer, the term of this patent is extended or adjusted under 35 U.S.C. 154(b) by 603 days.

(21) Appl. No.: 11/017,770

(22) Filed: Dec. 22, 2004

(65) Prior Publication Data

US 2005/0148687 A1 Jul. 7, 2005

(30) Foreign Application Priority Data

Jan. 6, 2004 (JP) ............................. 2004-000937

(51) Int. Cl.
*C08K 11/00* (2006.01)

(52) U.S. Cl. .................. 523/160; 523/161; 524/249

(58) Field of Classification Search ................ 523/160, 523/161; 524/249
See application file for complete search history.

(56) References Cited

U.S. PATENT DOCUMENTS

2002/0136968 A1* 9/2002 Takebe ......................... 430/7
2003/0191256 A1 10/2003 Hayashi

FOREIGN PATENT DOCUMENTS

JP 2003-231860 8/2003

* cited by examiner

*Primary Examiner*—Edward J Cain
(74) *Attorney, Agent, or Firm*—Finnegan, Henderson, Farabow, Garrett & Dunner, L.L.P.

(57) ABSTRACT

A cationic polymerizable composition comprising a cationic polymerizable mixture, a cationic polymerization initiator and an amino alcohol, wherein the amino alcohol contains two hydroxyl groups and one carbon chain containing a carbon atom having one or no hydrogen atom bonded to the carbon atom, an actinic ray curable ink-jet ink using the same, and a method of stabilizing the cationic polymerizable composition.

7 Claims, No Drawings

CATIONIC POLYMERIZABLE COMPOSITION, ACTINIC RAY CURABLE INK-JET INK AND STABILIZATION METHOD OF THE CATIONIC POLYMERIZABLE COMPOSITION

TECHNICAL FIELD

The present invention relates to a cationic polymerizable composition exhibiting excellent storage stability, dispersion stability of colorants, and, also, excellent sensitivity and safety.

BACKGROUND

As quick drying printing ink, known are the ink compositions cured via radical polymerization due to irradiation with actinic rays. However, these ink compositions tend to suffer from curing inhibition in the presence of oxygen.

Recently, an ink composition cured via cationic polymerization with irradiation of actinic rays has been proposed. Proposed ink compositions contain an oxetane compound, an optical cationic polymerization initiator and a pigment, and may include an epoxy compound if needed. Since cationic polymerization is initiated by existence of cations generated from a cationic polymerization initiator by irradiation of, for example, UV rays, polymerization is not inhibited by oxygen. Accordingly, the polymerization is not necessary to be carried out under an inert atmosphere, and has the advantage that prompt and complete polymerization can be performed in air.

However, when a cationic polymerization initiator is added to a cationic polymerizable compound, for example, an oxetane compound or an epoxy compound, and the composition is stored over a long period, cations may spontaneously be generated from the cationic initiator even when no UV rays are intercepted, resulting in a viscosity increase and a gelling of the composition due to initiation of polymerization of the cationic polymerizable compound.

In order to resolve this problem, addition of various amine compounds to improve storage stability has been proposed (for example, see Patent Documents 1-5.).

However, prevention effect of polymerization of the cationic polymerizable compounds has not been fully acquired by the use of amines disclosed so far. In a case of an ink which contains a colorant, condense of the colorant tends to occur and the dispersion stability has not been fully enough. By addition of an amine, the energy required for curing the ink increases, and, when the amines disclosed so far are added to the ink composition, the curability of the ink tends to become relatively lower. Further, the ink composition added with the amines disclosed so far may have safety problems, namely, the ink composition relatively easily causes a rash, when in contact with bare skin.

(Patent document 1) Japanese Patent Publication Open to Public Inspection (hereafter referred to as JP-A) No. 5-132505
(Patent document 2) JP-A No. 6-184093
(Patent document 3) JP-A No. 2000-186079
(Patent document 4) JP-A No. 2001-200049
(Patent document 5) JP-A No. 2003-292606

SUMMARY OF THE INVENTION

An object of the present invention is to provide an ink-jet ink exhibiting storage stability of a cationic polymerizable composition containing a cationic polymerization initiator, dispersion stability of colorants, superior curability and safety, and to provide a technology to stabilize the cationic polymerizable composition even when the composition is stored over a long period.

One embodiment of the present invention is a cationic polymerizable composition comprising a cationic polymerizable mixture, a cationic polymerization initiator and an amino alcohol, wherein the amino alcohol has a specified structure.

DESCRIPTION OF THE PREFERRED EMBODIMENTS

The above object of the present invention is achieved by the following structure.

(1) A cationic polymerizable composition comprising a cationic polymerizable mixture, a cationic polymerization initiator and an amino alcohol, wherein the amino alcohol contains two hydroxyl groups and one carbon chain containing a carbon atom having one or no hydrogen atom bonded to the carbon atom.

(2) The cationic polymerizable composition of Item (1), wherein the cationic polymerizable mixture comprises an alicyclic epoxy compound and an oxetane compound.

(3) The cationic polymerizable composition of Item (1) or Item (2), wherein a content of the amino alcohol is 0.001 to 0.1% by weight based on the total weight of the cationic polymerizable composition.

(4) The cationic polymerizable composition of any one of Items (1) to (3) further containing water, wherein a content of the water is 0.1 to 5% by weight based on the total weight of the cationic polymerizable composition.

(5) The cationic polymerizable composition of any one of Items (1) to (4), wherein a viscosity of the cationic polymerizable composition at 23° C. is 5 to 50 mPs·s.

(6) The cationic polymerizable composition of any one of Items (1) to (5) further comprising a colorant.

(7) An actinic ray curable ink-jet ink comprising the cationic polymerizable composition of any one of Items (1) to (6).

(8) A method for stabilizing a cationic polymerizable composition containing a cationic polymerizable mixture and a cationic polymerization initiator, the method comprising the step of:
adding an amino alcohol to the cationic polymerizable composition,
wherein the amino alcohol contains two hydroxyl groups and one carbon chain containing a carbon atom having one or no hydrogen atom bonded to the carbon atom.

The present invention will now be described in further detail, however, the present invention is not limited thereto.

According to one embodiment of the present invention, provided is a cationic polymerizable composition containing a cationic polymerizable mixture, a cationic polymerization initiator, and an amino alcohol having at least two hydroxyl groups, and one carbon chain containing a carbon atom having one or no hydrogen atom bonded to the carbon atom.

According to another embodiment of the present invention, provided is a method of stabilizing the cationic polymerizable composition, including adding the above mentioned amino alcohol to the cationic polymerizable composition containing a cationic polymerizable mixture and a cationic polymerization initiator.

Examples of a cationic polymerizable compound include, cationic polymerizable vinyl compounds, lactones, and cyclic ethers. Examples of a cationic polymerizable vinyl compound include styrene and vinyl ethers. Examples of cyclic ethers include: epoxy compounds, oxetane compounds, spiro-orthoesters, bicyclo-orthoesters and cyclocarbonates.

An epoxy compound means a compound which is a 3-membered ring having an oxirane group as represented by Formula (1), and examples of the epoxy compound include aromatic epoxy compounds and alicyclic epoxy compounds.

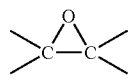

Formula (1)

An oxetane compound means a compound having an oxetane ring which is a 4-membered ether ring as represented by Foumula (2).

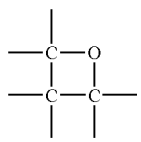

Formula (2)

Preferable cationic polymerizable compounds include an cyclic ether which conducts ring-opening polymerization in the presence of cations, and more preferable are an alicyclic epoxy compound and an oxetane compound. A mixture of a alicyclic epoxy compound and an oxetane compound is specifically preferable, since the mixture exhibits superior curability. The mixing ratio of an alicyclic epoxy compound to an oxetane compound (alicyclic epoxy compound:oxetane compound) is normally 5:95 to 95:5, and preferably 10:90 to 50:50. When the amount of oxetane compound is too low, flexibility of the cured substance or resistance to solvents may be lost, and, contrarily, when the amount of oxetane compound is too high, curing may become insufficient under humid conditions.

Examples of a preferable oxetane compound include: 3-ethyl-3-hydroxymethyl oxetane; 1,4bis{[(3-ethyl-3-oxetanyl)methoxy]methyl}benzene; 3-ethyl-3-(phenoxymethyl) oxetane, 3-ethyl-3-(2-ethylhexyloxymethyl)oxetane; and di[1-ethyl(3-oxetanyl)]methyl ether.

Examples of a preferable alicyclic epoxy compound include alicyclic epoxy resins, for example: 3,4-epoxycyclohexylmethyl-3',4'-epoxycyclohexane carboxylate (marketed under trade names: UVR6105, UVR6110 and Celloxide 2021); bis(3,4-epoxycyclohexylmethyl)adipate (marketed under UVR 6128); vinylcyclohexene monoepoxide (marketed under Celoxide 2000); ε-caprolactone denaturation3,4-epoxycyclohexylmethyl3',4'-epoxy cyclohexanecarboxylate (marketed as Celoxide 2081), and 1-methyl-4-(2-methyloxylanyl)-7-oxabicyclo[4,1,0]heptane (marketed as Celoxide 3000). Marketed products under the trade names of: UVR6105, UVR6110, and UVR6128 are obtainable from Dow Chemical Co. The products under the trade names: Celoxide 2000, Celoxide 2021, Celoxide 2081, and Celoxide 3000 are marketed by Daicel Chemical Industries, Ltd. UVR6105 is the low-viscosity counter product of UVR6110.

Still more preferable alicyclic epoxy compounds include the compounds represented by the following Formulae (3) and (4).

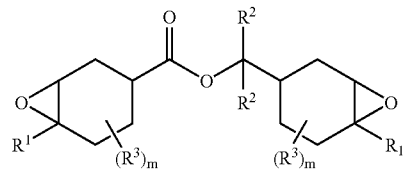

Formula (3)

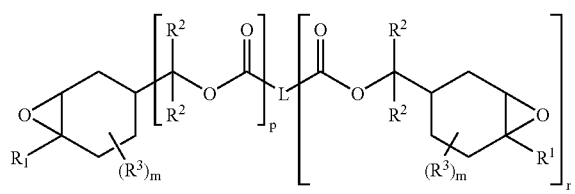

Formula (4)

In the above formulae, $R^1$, $R^2$, $R^3$ each independently represents a substituent. m represents an integer of 0 to 2. p represents 0 or 1. r represents an integer of 1 to 3. L represents a single bond or a linking group having a valence of r+1 and a carbon number of 1 to 15, which may have an oxygen atom or a sulfur atom in the main chain.

The alicyclic epoxy compounds represented by Formulae (3) and (4) will now be further explained. In the above formulae, $R^1$ represents a hydrogen atom or a substituent, examples of which include: alkyl groups having 1 to 6 carbon atoms (for example, a methyl group, an ethyl group, a propyl group, an isopropyl group and a butyl group). $R^2$ represents a substituent, examples of which include: alkyl groups having 1 to 6 carbon atoms (for example, a methyl group, an ethyl group, a propyl group, an isopropyl group and a butyl group).

$R^3$ represents a substituent, examples of which include: halogen atoms (for example, a chlorine atom, a bromine atom and a fluorine atom); alkyl groups having 1 to 6 carbon atoms (for example, a methyl group, an ethyl group, a propyl group, an isopropyl group and a butyl group); alkoxy groups having 1-6 carbon atoms (for example, a methoxy group, an ethoxy group, n-propoxy group, an iso-propoxy group, n-butoxy group and a tert-butoxy group); acyl groups (for example, an acetyl group, a propionyl group and a trifluoro acetyl group); acyloxy groups (for example, an acetoxy group, a propionyloxy group and a trifluoroacetoxy group); and alkoxycarbonyl groups (a methoxycarbonyl group, an ethoxycarbonyl group and a tert-butoxycarbonyl group). Among these, an alkyl group, an alkoxy group, and an alkoxycarbonyl group are preferable as a substituent.

m represents an integer of 0 to 2. p represents 0 or 1.

L represents a single bond or represents a linking group having 1 to 15 carbon atoms and a valence of r+1, which may further have an oxygen atom or a sulfur atom in the main chain of the linking group. Examples of the linking group represented by L include (i) the groups listed below, and (ii) combined groups of a plurality of —O—, —S—, —Co—, —CS— groups with the compounds listed below.

A methylene group [—CH$_2$—],
an ethylidene group [>CHCH$_3$],
an isopropylidene group [>C(CH$_3$)$_2$],
a 1,2-ethylene group [—CH$_2$CH$_2$—],
a 1,2-propylene group [—CH(CH$_3$)CH$_2$—],
a 1,3-propanediyl group [—CH$_2$CH$_2$CH$_2$—],
a 2,2-dimethyl-1,3-propanediyl group [—CH$_2$C(CH$_3$)$_2$CH$_2$—], a 2,2-dimethoxy-1,3-propanediyl group [—CH$_2$C(OCH$_3$)$_2$CH$_2$—],
a 2,2-dimethoxymethyl-1,3-propanediyl group [—CH$_2$C(CH$_2$OCH$_3$)$_2$CH$_2$—],
a 1-methyl-1,3-propanediyl group [—CH(CH$_3$)CH$_2$CH$_2$—],
a 1,4-butanediyl group [—CH$_2$CH$_2$CH$_2$CH$_2$—],
a 1,5-pentanediyl group [—CH$_2$CH$_2$CH$_2$CH$_2$CH$_2$—],
an oxydiethylene group [—CH$_2$CH$_2$OCH$_2$CH$_2$—],
a thiodiethylene group [—CH$_2$CH$_2$SCH$_2$CH$_2$—],
a 3-oxothiodiethylene group [—CH$_2$CH$_2$SOCH$_2$CH$_2$—],
a 3,3-dioxothio diethylene group [—CH$_2$CH$_2$SO$_2$CH$_2$CH$_2$—],
a 1,4-dimethyl-3-oxa-1,5-pentanediyl group [—CH(CH$_3$)CH$_2$OCH(CH$_3$)CH$_2$—],
a 3-oxo-pentanediyl group [—CH$_2$CH$_2$COCH$_2$CH$_2$—],
a 1,5-dioxo-3-oxapentanediyl group [—COCH$_2$OCH$_2$CO—],
a 4-oxa-1,7-heptanediyl group [—CH$_2$CH$_2$CH$_2$OCH$_2$CH$_2$CH$_2$—],
a 3,6-dioxa-1,8-octanediyl group [—CH$_2$CH$_2$OCH$_2$CH$_2$OCH$_2$CH$_2$—],
a 1,4,7-trimethyl-3,6-dioxa-1,8-octanediyl group [—CH(CH$_3$)CH$_2$OCH(CH$_3$)CH$_2$OCH(CH$_3$)CH$_2$—],
a 5,5-dimethyl-3,7-dioxa-1,9-nonanediyl group [—CH$_2$CH$_2$OCH$_2$C(CH$_3$)$_2$CH$_2$OCH$_2$CH$_2$—],
a 5,5-dimethoxy-3,7-dioxa-1,9-nonanediyl group [—CH$_2$CH$_2$OCH$_2$C(OCH$_3$)$_2$CH$_2$OCH$_2$CH$_2$—],
a 5,5-dimethoxymethyl-3,7-dioxa-1,9-nonanediyl group [—CH$_2$CH$_2$OCH$_2$C(CH$_2$OCH$_3$)$_2$CH$_2$OCH$_2$CH$_2$—],
a 4,7-dioxo-3,8-dioxa-1,10-decanediyl group [—CH$_2$CH$_2$O—COCH$_2$CH$_2$ CO—OCH$_2$CH$_2$—],
a 3,8-dioxo-4,7-dioxa-1,10-decanediyl group [—CH$_2$CH$_2$CO—OCH$_2$CH$_2$O—COCH$_2$CH$_2$—],
a 1,3-cyclopentanediyl group [-1,3-C$_5$H$_8$—],
a 1,2-cyclohexanediyl group [-1,2-C$_6$H$_{10}$-],
a 1,3-cyclohexanediyl group [-1,3-C$_6$H$_{10}$-],
a 1,4-cyclohexanediyl group [-1,4-C$_6$H$_{10}$-],
a 2,5-tetrahydrofurandiyl group [-2,5-C$_4$H$_6$O-]
a p-phenylene group [-p-C$_6$H$_4$—],
an m-phenylene group [-m-C$_6$H$_4$—],
an α,α'-o-xylylene group [-o-CH$_2$—C$_6$H$_4$—CH$_2$—],
an α,α'-m-xylylene group [-m-CH$_2$—C$_6$H$_4$—CH$_2$—],
an α,α'-p-xylylene group [-p-CH$_2$—C$_6$H$_4$—CH$_2$—],
a furan-2,5-diyl-bismethylene group [-2,5-CH$_2$—C$_4$H$_2$O—CH$_2$—],
a thiophene-2,5-diyl-bismethylene group [-2,5-CH$_2$—C$_4$H$_2$S—CH$_2$—], and
an isopropylidenebis-p-phenylene group [-p-C$_6$H$_4$—C(CH$_3$)$_2$-p-C$_6$H$_4$—].

Linking groups having a valence of 3 or more include, for example, (i) the above described divalent linking groups from which one or a necessary number of hydrogen atoms are suitably removed and (ii) the combined groups of a plurality of —O—, —S—, —CO— and —CS— groups with the above described linking groups having a valence of 3 or more.

L may further have a substituent, examples of which include: halogen atoms (for example, a chlorine atom, a bromine atom and a fluorine atom); alkyl groups having 1 to 6 carbon atoms (for example, a methyl group, an ethyl group, a propyl group, an isopropyl group and a butyl group); alkoxy groups having 1-6 carbon atoms (for example, a methoxy group, an ethoxy group, n-propoxy group, an iso-propoxy group, n-butoxy group and a tert-butoxy group); acyl groups (for example, an acetyl group, a propionyl group and a trifluoro acetyl group); acyloxy groups (for example, an acetoxy group, a propionyloxy group and a trifluoroacetoxy group); and alkoxycarbonyl groups (a methoxycarbonyl group, an ethoxycarbonyl group and a tert-butoxycarbonyl group). Of these, the alkyl group, the alkoxy group, and the alkoxycarbonyl group are preferable as a substituent.

As the linking group represented by L, preferable is a divalent linking group having 1 to 8 carbon atoms, which may further have an oxygen atom or a sulfur atom in its main chain, and more preferable is a divalent linking group having 1 to 5 carbon atoms, wherein the main chain of the divalent linking group contains only carbon atoms.

Specific examples of a preferable alicyclic epoxide are shown below, however, the present invention is not limited thereto.

EP-1
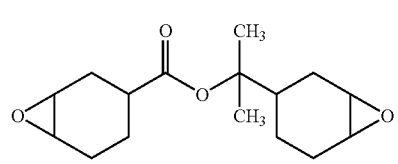

EP-2
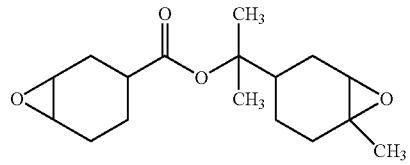

EP-3
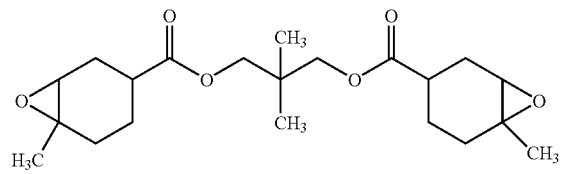

EP-4
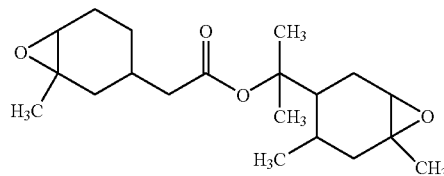

EP-5
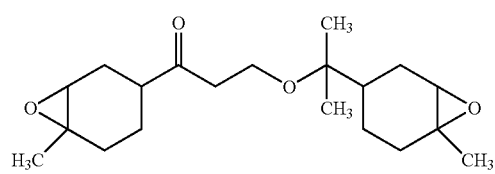

EP-6
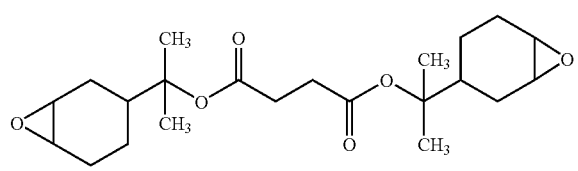

-continued
EP-7
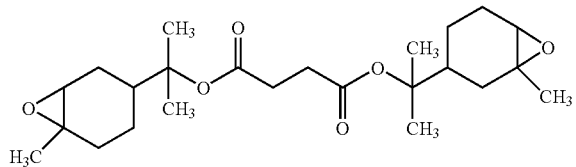
EP-8
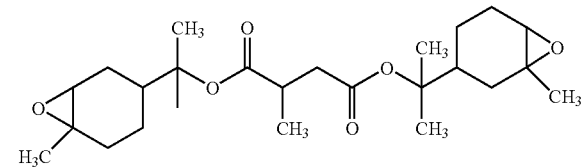
EP-9
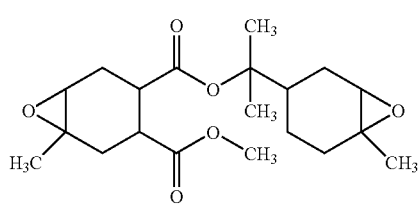
EP-10
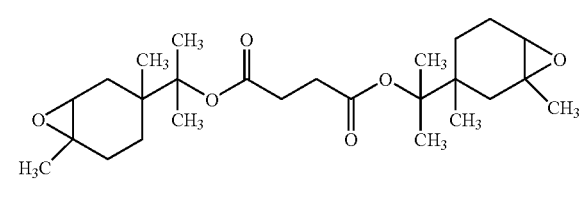
EP-11
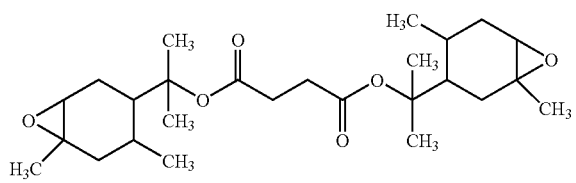
EP-12
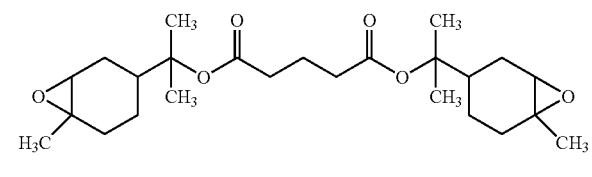
EP-13
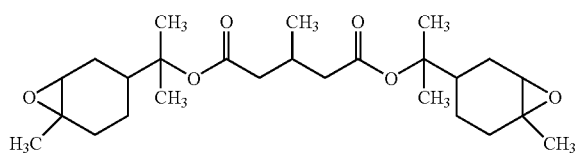
EP-14
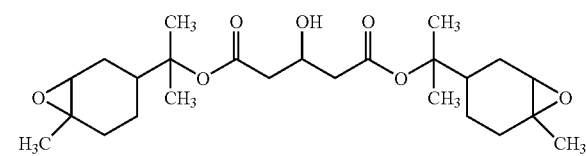
EP-15
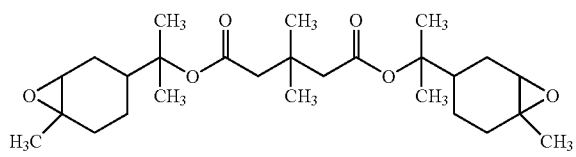
EP-16
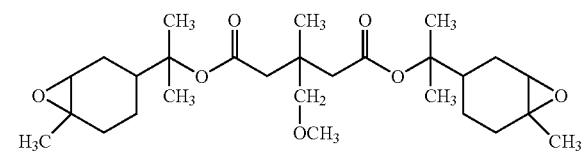
EP-17
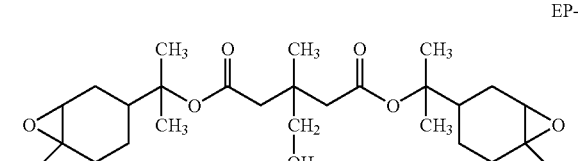
EP-18
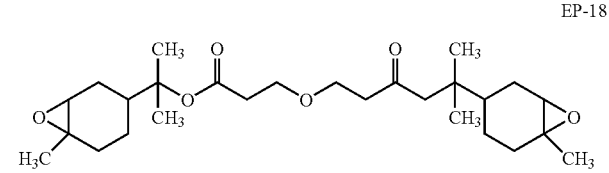
EP-19
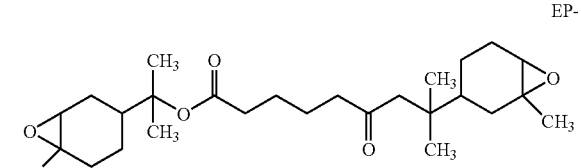
EP-20
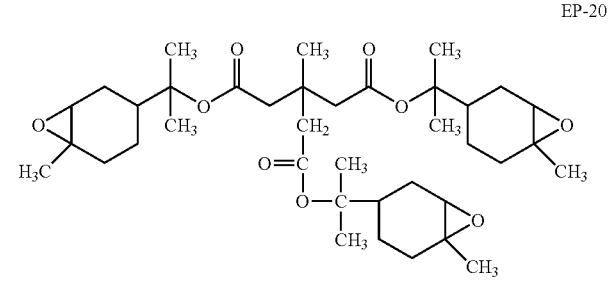

-continued

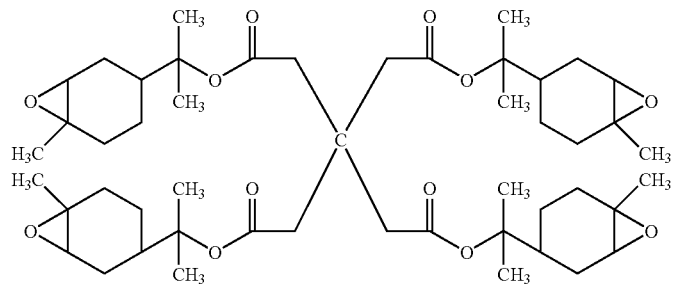
EP-21

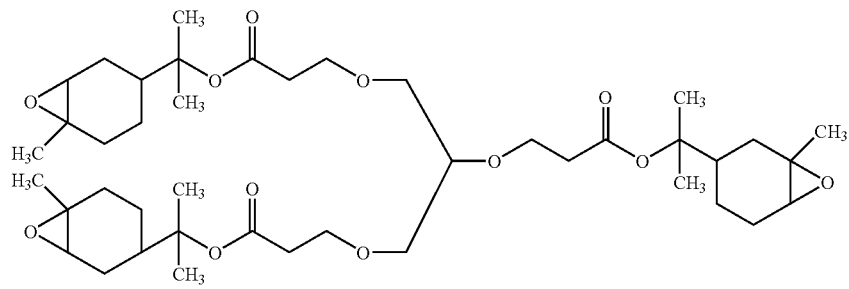
EP-22

EP-23

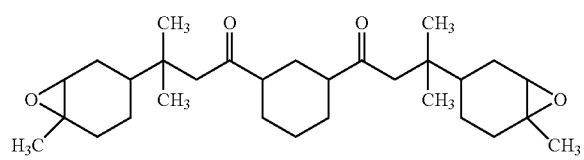

EP-24

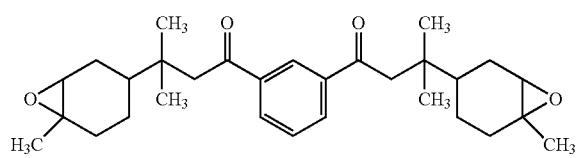

The alicyclic epoxy compounds of the present invention are synthesized according to the method disclosed in the following patent documents.

U.S. Pat. Nos. 2,745,847, 2,750,395, 2,853,498, 2,853,499, and 2,863,881.

The specific examples of a cationic polymerizable compound are disclosed in JP-A Nos. 8-143806, 8-283320, 2000-186079 and 2000-327672. The present invention may also be put into practice by suitably selecting the compounds disclosed in the above patent documents.

Examples of a cationic polymerization initiator include diaryliodonium salts and triarylsulfonium salts, in addition to known sulfonium salts and ammonium salts, and the cationic polymerization initiator may be selected from the compounds disclosed in JP-A Nos. 8-143806 and 8-283320. Also, commercially available cationic polymerization initiators may be used as received. Typical examples of a commercially available cationic polymerization initiator include, by trade names: CI-1370, CI-2064, CI-2397, CI-2624, CI-2639, CI-2734, CI-2758, CI-2823, CI-2855 and CI-5102 (all the above being produced by Nippon Soda Co., Ltd.); Photoinitiator 2074 (produced by Rhodia Inc.); and UVI-6974 and UVI-6990 (produced by Union Carbide Corp.) Of these, preferable is a triarylsulfonium salt being one of the sulfonium salts selected from the following Formulae (5) to (8).

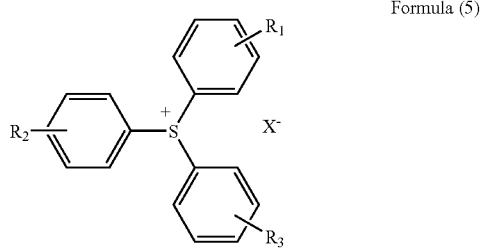
Formula (5)

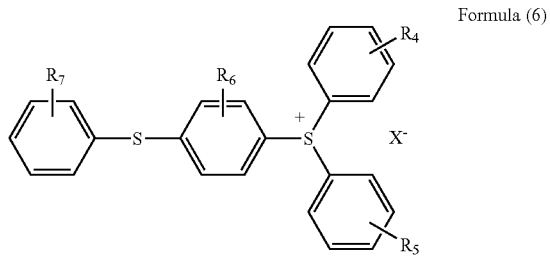
Formula (6)

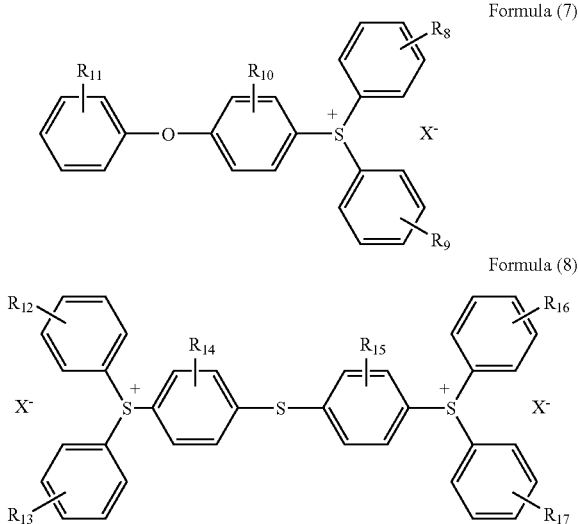

In the above Formulae (5) through (8), $R_1$ through $R_{17}$ independently represent a hydrogen atom or a substituent, provided that $R_1$ through $R_3$ are not simultaneously hydrogen atoms, $R_4$ through $R_7$ are not simultaneously hydrogen atoms, $R_8$ through $R_{11}$ are not simultaneously hydrogen atoms, and $R_{12}$ through $R_{17}$ are not simultaneously hydrogen atoms.

Examples of the substituent represented by $R_1$ through $R_{17}$ include an alkyl group such as a methyl group, an ethyl group, a propyl group, an isopropyl group, a butyl group, an isobutyl group, a t-butyl group, a pentyl group, or a hexyl group; an alkoxy group such as a methoxy group, an ethoxy group, a propoxy group, an isopropyl group, a butoxy group, a hexyloxy group, a decyloxy group or a dodecyloxy group; a carbonyl group such as an acetoxy group, a propionyloxy group, a decylcarbonyloxy group, a dodecylcarbonyloxy group, a methoxycarbonyl group, an ethoxycarbonyl group or a benzoyloxy group; a phenylthio group; a halogen atom such as fluorine, chlorine, bromine or iodine; a cyano group; a nitro group; and a hydroxyl group.

X represents a non-nucleophilic anion residue. Examples thereof include a halogen atom such as F, Cl, Br or I, $B(C_6F_5)_4$, $R_{18}COO$, $R_{19}SO_3$, $SbF_6$, $AsF_6$, $PF_6$, and $BF_4$, in which $R_{18}$ and $R_{19}$ independently represent an alkyl group such as a methyl group, an ethyl group, a propyl group or a butyl group; an alkyl group having, as a substituent, a halogen atom such as fluorine, chlorine, bromine or iodine, a nitro group, a cyano group, a methoxy group or an ethoxy group; or a phenyl group. Among these, $B(C_6F_5)_4^-$ and $PF6^-$ are preferred in regard to operation safety.

The above described compounds may be easily synthesized using commonly known methods, for example, in the same manner as the method to prepare a photo-acid generator described in The Chemical Society of Japan, Vol. 71, No. 11 (1998) or in "Organic Materials for Imaging" edited by The Japanese Research Association for Organic Electronics Materials (1993), Bun-Shin Publishing.

Specific examples of a sulfonium compound preferably used in the present invention will be shown below.

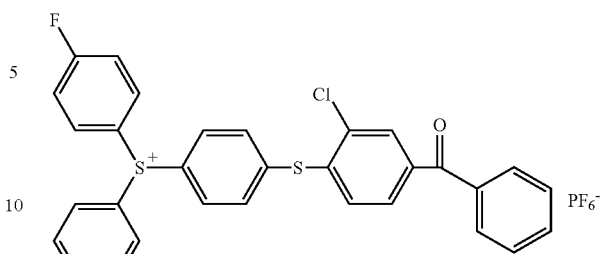

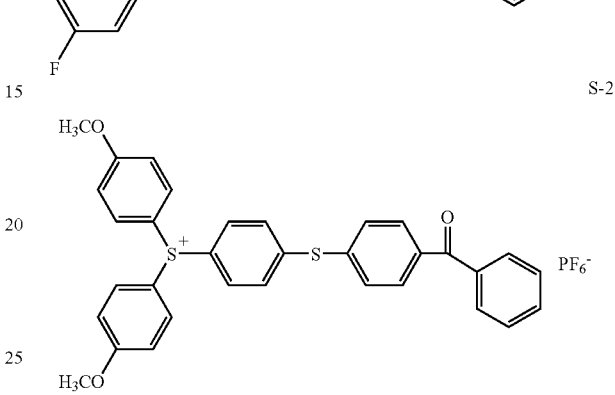

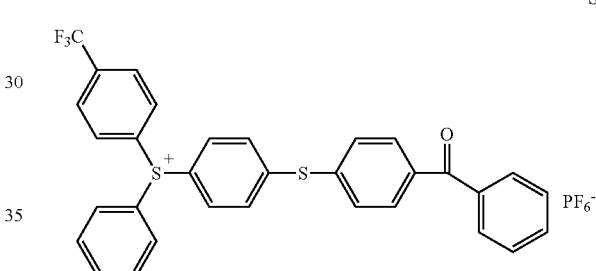

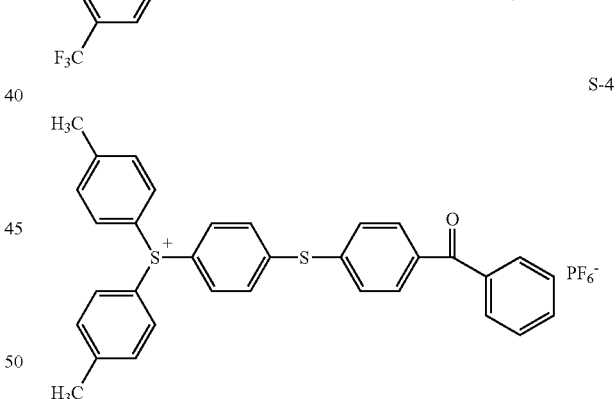

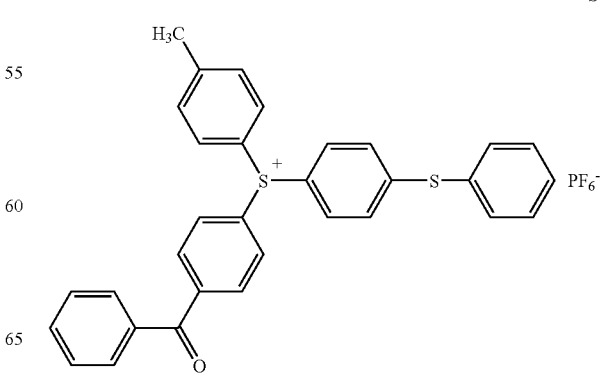

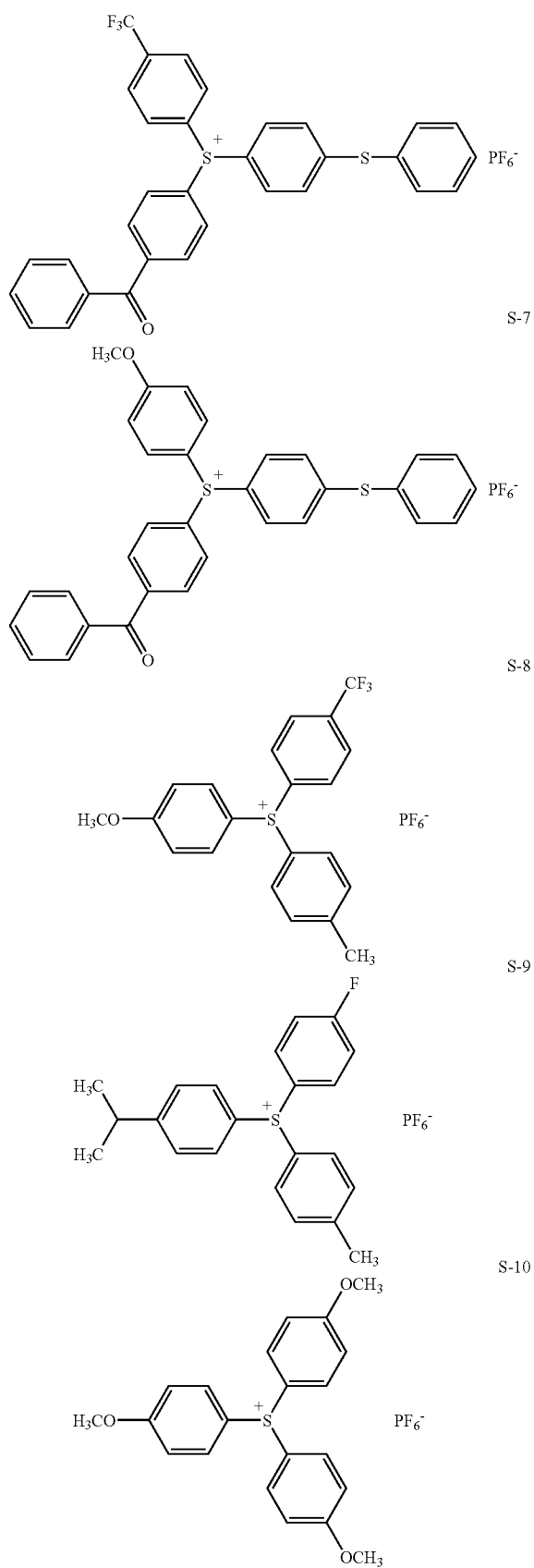

The amount of cationic polymerization initiator to be used depends on the types of the initiator and the cationic polymerizable compound, the amount ratio thereof, and on the condition of usage. The used amount of polymerization initiator to be used is normally 0.1 to 20 weight parts, preferably 0.5 to 10 weight parts and more preferably 1 to 5 weight parts in 0.100 weight parts of the cationic polymerizable compound. When a larger amount of the cationic polymerization initiator is used, polymerization proceeds quickly, however, the storage stability tends to degrade. When a smaller amount of the cationic polymerization initiator is used, curability tends to be degraded.

Specific examples of an amino alcohol containing two hydroxyl groups and one carbon chain containing a carbon atom having one or no hydrogen atom bonded to the carbon atom will be shown below, however, the present invention is not limited thereto.

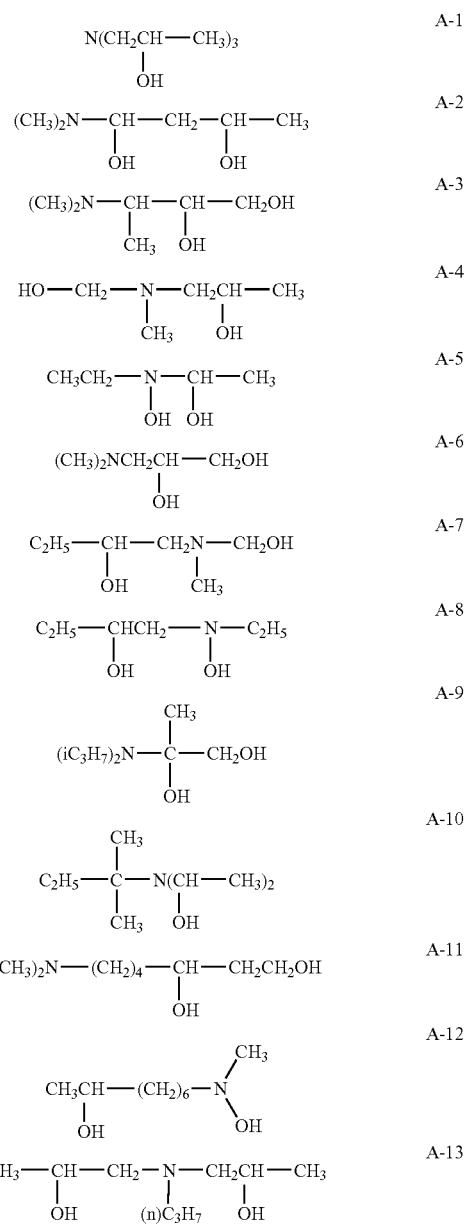

-continued

A-14
$$HOCH_2CH_2N(CH_2CHOH)_2$$
with CH$_3$ on the CHOH carbons

A-15
$$(n)C_3H_7-N(CH_2CH_2OH)(CH_2CHOH-CH_3)$$

A-16
$$HO-CH(CH_3)-CH_2N(CH_2CH_2OH)_2$$

A-17
$$(n)C_3H_7-N(CH_2OH)(CH(CH_3)-CH(CH_3)-OH)$$

A-18
$$HOCH_2-N(CH_2CH_2OH)(CH(CH_3)-CH(CH_3)-OH)$$

A-19
$$(CH_3)_2CH-CH_2-N(CH_2CH_2CH_2OH)_2$$

A-20
$$N(CH_2CH(CH_3)-OH)_3$$

A-21
$$N(CH(CH_3)CH_2-OH)_3$$

A-22
$$N{-}(C(CH_3)_2{-}OH)_3$$

In the present invention, the content of the above described amino alcohol depends on the type and content of the cationic polymerizable compound, the type and content of the cationic polymerization initialtor, the storing condition and the curing condition, however, it is normally 0.0001 to 1.0% by weight and preferably 0.001 to 0.1% by weight based on the total weight of the cationic polymerizable composition. When the content of the amino alcohol is too low, the storage stability of the cationic polymerizable composition may become insufficient, while when it is excessive, curing may become insufficient.

The cationic polymerizable composition of the present invention is prepared by thoroughly mixing the cationic polymerizable compound, the cationic polymerization initiator and the above described amino alcohol. Further, by adding and mixing well the above described amino alcohol to a conventional cationic polymerizable composition containing a cationic polymerizable compound and a cationic polymerization initiator or to a conventional ink composition, enhanced storage stability or enhanced dispersion of colorant of these compositions are achieved.

The cationic polymerizable composition of the present invention preferably contains 0.1 to 5% by weight of water based on the total weight of the cationic polymerizable composition, in order to obtain sufficient storage stability.

The ink-jet ink of the present invention is sealed in a container while the water content determined by the Karl-Fischer method is 1.50 to 5.00% by weight, and then stored. For example, the above mentioned water content is obtained by sealing the ink-jet ink under a high humidity condition of 80% RH at 20° C., however, the method of sealing is not limited thereto. When the water content is lower than 1.50% by weight, variation in viscosity of the ink-jet ink after storage becomes larger and ejection of the ink from the recording head becomes unstable. The unstable ink ejection is specifically noticeable when an amount of the ejected ink drop is relatively small. When the water content is higher than 5.00% by weight, curing of the ink is drastically reduced, which becomes a bigger problem in the case when immediate curing after ink deposition on the recording material is required, to improve image quality.

By using an actinic ray curable ink containing a cationic polymerizable monomer and an initiator, the water content of which is controlled within the above described range, stabilized formation of a high resolution image is achieved without being affected by variation of storing conditions (temperature and humidity) and printing conditions (temperature and humidity). It is also preferable to prepare a closed ink-supplying system from the ink container to the recording head in order to more effectively attain an object of the present invention.

When an oxetane compound is contained as a cationic polymerizable monomer, control of water content is specifically effective. When an oxetane compound and an oxysilane compound are contained together, control of water content plays a furthermore important role.

The viscosity of the cationic polymerizable composition of the present invention is suitably controlled depending on the purpose to use by selecting the molecular weight or combination of the cationic polymerizable compounds. When the cationic polymerizable composition of the present invention is used as a UV-curable ink or its vehicle of a business printer, the viscosity of the ink at 23° C. is adjusted to be 5 to 50 mPa·s, and more preferably 10 to 30 mPa·s.

Colorants to be mixed in the cationic polymerizable composition of the present invention include pigments and dyes. Examples of a pigment include: inorganic pigments, for example, carbon black, acetylene black, lamp black, titanium oxide, chrome yellow, and ultramarine blue; and include organic pigments, for example: azo pigments, phthalocyanine pigments, and quinacridone. Examples of a dye include azo type dyes and anthraquinone type dyes. The amount of added colorant is normally 0.1 to 30 weight parts and preferably 1 to 15 weight parts in 100 weight parts of a cationic polymerizable compound.

The cationic polymerizable composition of the present invention is cured by starting polymerization by means of irradiating actinic rays, for example, UV rays, X-rays or electron beams, or heating. A variety of additives besides colorants may be mixed with the cationic polymerizable composition of the present invention, for example, a dispersion agent, a sensitizer, a fire retarder, a high temperature solvent (non-VOC), an antistatic agent, and a surfactant. The cationic polymerizable composition mixed with the above additives may be suitably used as a gloss varnish, a paint, an adhesive, a prepreg (pre-impregnated sheet material), sealing material, a laminating sheet, and molding material.

EXAMPLES

The present invention will now be more specifically explained using examples, however, the present invention is not limited thereto. The methods to examine the cationic polymerizable composition (also referred to merely as the composition) are described below.

(Storage Stability)

Storage stability of the composition was evaluated by a ratio (V1/V0), where V1 represents the viscosity of the composition stored at 70° C. for one month while V0 represents the initial viscosity of the composition before storage.

(Dispersion Stability of Colorant)

The changing rate of particle size of the pigment in the composition was determined according to the formula: D1/D0, where D0 represents the initial particle size of the pigment in the composition and D1 represents the particle size of the pigment after the composition was subjected to an accelerated test at a high temperature, namely, the composition was sealed in a closed container and stored at 70° C. for one month. The particle size of the pigment in the composition was defined as an average particle size measured by using a particle size distribution measurement equipment, produced by Malvern Instrument Ltd.

(Curability)

Printing was carried out on a polyethyleneterephthalate sheet using an ink-jet printer having a piezo head, followed by curing with a UV irradiator (having 8 cold cathode valves, at an output power of 20 W) under the conditions described in the Table 3 (temperature and humidity), at a substrate conveying rate of 500 mm/s. Curability was evaluated as follows: the printed polyethyleneterephthalate sheet was repeatedly passed through the UV irradiator having a conveyer until no tuck was manually detected, and the number of times the sheet passed through the UV irradiator was used for the evaluation of curability.

(Safety of the Composition)

A: No reaction is observed when skin comes in contact with the composition.
B: Negligible reaction is observed when skin comes in contact with the composition.
C: Reddening is observed when skin comes in contact with the composition.
D: Blistering is observed when skin comes in contact with the composition.

(Measurement of Viscosity)

The viscosity of the composition was measured by an E type viscometer (produced by Toki Sangyo Co., Ltd.) at 10 rpm at 23° C.

(Preparation of Inks 1 to 6 of the Present Invention)

The pigment, dispersion agent, epoxy compound and oxetane compound shown in Table 1 were charged into a sand mill and dispersed for four hours to obtain a raw solution of the actinic ray curable ink. A cationic polymerization initiator was added to the raw solution and gently mixed until the initiator was dissolved and then the mixture was subjected to pressure filtration using a membrane filter to obtain an actinic ray curable ink-jet ink. The viscosity of all prepared inks was in the range of 25 to 28 mPa·s.

TABLE 1

| | | Inventive Inks | | | | | |
|---|---|---|---|---|---|---|---|
| | | 1 | 2 | 3 | 4 | 5 | 6 |
| Pigments | P1 | 2.5 | 2.5 | 2.5 | 2.5 | 2.5 | 2.5 |
| Epoxy | CEL2021P | 21.45 | 21.45 | 21.45 | | | |
| Compounds | EP-3 | | | | 17.45 | 17.45 | 17.45 |
| Oxetane Compounds | OXT221 | 63 | 63 | 63 | 67 | 67 | 67 |
| Amino Alcohol | A-1 | 0.05 | | | | | |
| | A-2 | | 0.05 | | | | |
| | A-10 | | | 0.05 | | | |
| | A-6 | | | | 0.05 | | |
| | A-9 | | | | | 0.05 | |
| | A-11 | | | | | | 0.05 |
| Pigment Dispersant | 32000 | 3 | 3 | 3 | 3 | 3 | 3 |
| Initiator | S-10 | 10 | 10 | 10 | 10 | 10 | 10 |

Compounds in the table are explained below. Relevant figures in the table represent % by weight.

Pigment (P1):

250 weight parts of crude copper phthalocyanine ("copper phthalocyanine" produced by Toyo Ink Mfg. Co., Ltd.), 2500 weight parts of sodium chloride and 160 weight parts of polyethylene glycol were placed in a 1 gallon polypropylene kneader (produced by Inoue Manufacturing Co., Ltd.) and kneaded for three hours. The mixture was added to 2.5 L of about 80° C. warm water and agitated for one hour using a high speed mixer to form a slurry. The slurry was filtered and washed five times with water to remove sodium chloride and the solvent. The product was spray-dried to obtain treated pigment.

A Cationic polymerizable compound (an oxetane compound):
  OXT 221: Oxetane compound (produced by Toagosei Co. Ltd.);
An epoxy compound:
  CEL 2021P (produced by Daicel Chemical Industries, Ltd.) and EP-3;
A pigment dispersant:
  32000: a modified aliphatic dispersant ("Solsperse 3200" (produced by Zeneka Ltd.)); and
An initiator (A sulfonium salt):
  S-10.

(Preparation of Comparative Inks)

Comparative Inks 1 to 6 were prepared in the same manner as Inks 1 to 6 of the present invention except that the amino alcohols shown in Table 2 were used. The results are summarized in Table 3.

TABLE 2

| Comparative Inks | Comparative Amino Alcohol |
|---|---|
| 1 | B-1 |
| 2 | B-2 |
| 3 | B-3 |
| 4 | B-4 |
| 5 | B-5 |
| 6 | B-6 |

Comparative amino alcohols:

$N(CH_2CH_2OH)_3$   B-1

$(CH_3)_2N\text{—}CH_2CH_2OH$   B-2

-continued

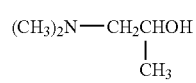
B-3

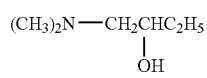
B-4

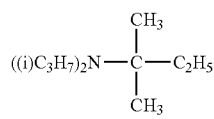
B-5

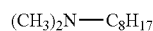
B-6

TABLE 3

| Inks | Storage Stability (V1/V0) | Colorant Dispersion Stabilizer (D1/D0) | Curability (27° C., 80% RH) | Safety |
|---|---|---|---|---|
| Inventive 1 | 1.05 | 1.03 | 1 | B |
| Inventive 2 | 1.10 | 1.02 | 1 | B |
| Inventive 3 | 1.10 | 1.01 | 1 | B |
| Inventive 4 | 1.15 | 1.02 | 1 | A |
| Inventive 5 | 1.13 | 1.02 | 1 | A |
| Inventive 6 | 1.13 | 1.04 | 1 | A |
| Comparative 1 | 1.3 | 1.4 | 2 | C |
| Comparative 2 | 1.4 | 1.2 | 2 | C |
| Comparative 3 | 1.3 | 1.2 | 2 | C |
| Comparative 4 | 1.5 | 1.3 | 2 | C |
| Comparative 5 | 1.4 | 1.3 | 2 | C |
| Comparative 6 | 1.3 | 1.2 | 2 | C |

What is claimed is:

1. A cationic polymerizable composition comprising
a cationic polymerizable mixture,
a cationic polymerization initiator and
an amino alcohol,
wherein the amino alcohol contains at least two hydroxyl groups and at least one carbon chain containing a carbon atom having one or no hydrogen atom bonded to the carbon atom, and
a content of water is 0.1 to 5% by weight based on a total weight of the cationic polymerizable composition.

2. The cationic polymerizable composition of claim 1, wherein the cationic polymerizable mixture comprises an alicyclic epoxy compound and an oxetane compound.

3. The cationic polymerizable composition of claim 1, wherein a content of the amino alcohol is 0.001 to 0.1% by weight based on the total weight of the cationic polymerizable composition.

4. The cationic polymerizable composition of claim 1, wherein a viscosity of the cationic polymerizable composition at 23° C. is 5 to 50 mPs·s.

5. The cationic polymerizable composition of claim 1, further comprising a colorant.

6. An actinic ray curable ink-jet ink comprising the cationic polymerizable composition of claim 1.

7. A method for stabilizing a cationic polymerizable composition containing a cationic polymerizable mixture and a cationic polymerization initiator, the method comprising the step of:
adding an amino alcohol to the cationic polymerizable composition,
wherein the amino alcohol contains at least two hydroxyl groups and at least one carbon chain containing a carbon atom having one or no hydrogen atom bonded to the carbon atom, and
a content of water is 0.1 to 5% by weight based on a total weight of the cationic polymerizable composition.

* * * * *